United States Patent [19]

Corcoran et al.

[11] Patent Number: 4,987,935
[45] Date of Patent: Jan. 29, 1991

[54] BI-DIRECTIONAL TREE SAW

[75] Inventors: Sean P. Corcoran, Hillsboro, Oreg.;
Thomas E. Dixon; Stanley Farmer,
both of Vancouver, Wash.; Emory D.
Hungerford, Milwaukee; Mark
Mallory, Portland, both of Oreg.

[73] Assignee: Esco Corporation, Portland, Oreg.

[21] Appl. No.: 461,358

[22] Filed: Jan. 5, 1990

[51] Int. Cl.$^5$ .............................................. A01G 23/08
[52] U.S. Cl. ................................... 144/34 R; 30/389;
30/379.5; 83/839; 83/928; 144/3 D; 144/241;
144/336
[58] Field of Search ................ 30/389, 379.5; 83/839,
83/928; 144/3 D, 34 R, 335, 336, 241

[56] References Cited
U.S. PATENT DOCUMENTS

| | | | |
|---|---|---|---|
| 3,468,351 | 9/1969 | Ehlen | 30/389 |
| 3,664,391 | 5/1972 | Coffey | 144/34 R |
| 3,945,289 | 3/1976 | Baez Rios | 83/839 |
| 4,013,106 | 3/1977 | Albright | 144/34 R |
| 4,081,009 | 3/1978 | Curlett | 144/34 R |
| 4,593,733 | 6/1986 | Hamilton | 30/389 |
| 4,763,705 | 8/1988 | Johnson | 144/34 R |
| 4,817,692 | 4/1989 | Denis | 30/389 |
| 4,932,447 | 6/1990 | Morin | 144/218 |

Primary Examiner—W. Donald Bray
Attorney, Agent, or Firm—Tilton, Fallon, Lungmus & Chestnut

[57] ABSTRACT

A tree saw includes a frame adapted to be attached to the boom of a prime mover, a tree clamping mechanism on the frame, and a carriage assembly on the frame below the clamping mechanism. The carriage assembly includes a generally plate-like chassis, a generally U-shaped bulkhead upstanding from the chassis and providing a recessed base portion and forwardly-extending arm portions, and a slide mechanism on the arm portions. A rail mechanism on the frame receives the slide mechanism for reciprocating movement of the carriage assembly. A hydraulic cylinder assembly interconnects the bulkhead and frame for reciprocating the carriage assembly. An annular rim member rotatably mounted on the chassis has a geared inner circumference and a toothed outer circumference projecting forwardly of the base portion. A motor-driven pinion mechanism on the chassis engages the rim member inner circumference to rotate the rim member.

36 Claims, 9 Drawing Sheets 4,987,935

BI-DIRECTIONAL TREE SAW

BACKGROUND AND SUMMARY OF THE INVENTION

This invention relates to a tree saw and, more particularly, to that type of tree saw referred to as a feller buncher.

In the harvesting of trees, i.e., logging, it has been the practice to mount the felling device on the front of a prime mover such a crawler tractor. The felling device is associated with clamping means to grasp the tree during and after the severing of the trunk and, where auxiliary clamping means are provided, the apparatus can "bunch" trees, i.e., clamping an already cut tree or trees while severing another.

Two basic types of severing means have been employed: the shear type and the saw type. The invention is of the latter type and, more particularly, is of the rim saw sub-type. By driving an annular cutting element from the inside rear, it is possible to cut much larger diameter trees with a given diameter rim saw than with a center driven disc saw--where only the radius is useful in penetrating the trunk.

Certain of the commercially-available feller bunchers of the rim saw type employ horizontally movable carriages to force the saw through the trunk. The inventive tree saw embodies a novel arrangement of hydraulic and mechanical features which allows a bi-directional cutting action, that is to say it may cut in either the clockwise or counterclockwise direction. The inventive carriage embodies a novel arrangement of hydraulic cylinders and rails to provide a narrower, more compact tree saw--an essential when felling trees in a densely forested area. In addition, the carriage has a novel bulkhead and open rear to protect the rim saw against damage. The open rear providing easy discharge of chips and snow without buildup.

The inventive rim saw employs a novel chassis as part of the carriage for removably supporting hook-shaped teeth which can be advantageously sharpened in the field, particularly because the teeth have concave cutting edges. Still further, a novel hydraulic system is provided to correlate the operations of saw rotation and feed control.

Other advantages of the invention may be seen in the ensuing specification. The invention is described in conjunction with the accompanying drawing in which--

FIG. 4b is a fragmentary top plan view of the rim saw portion seen in FIG. 4a;

DETAILED DESCRIPTION

Figure 1:
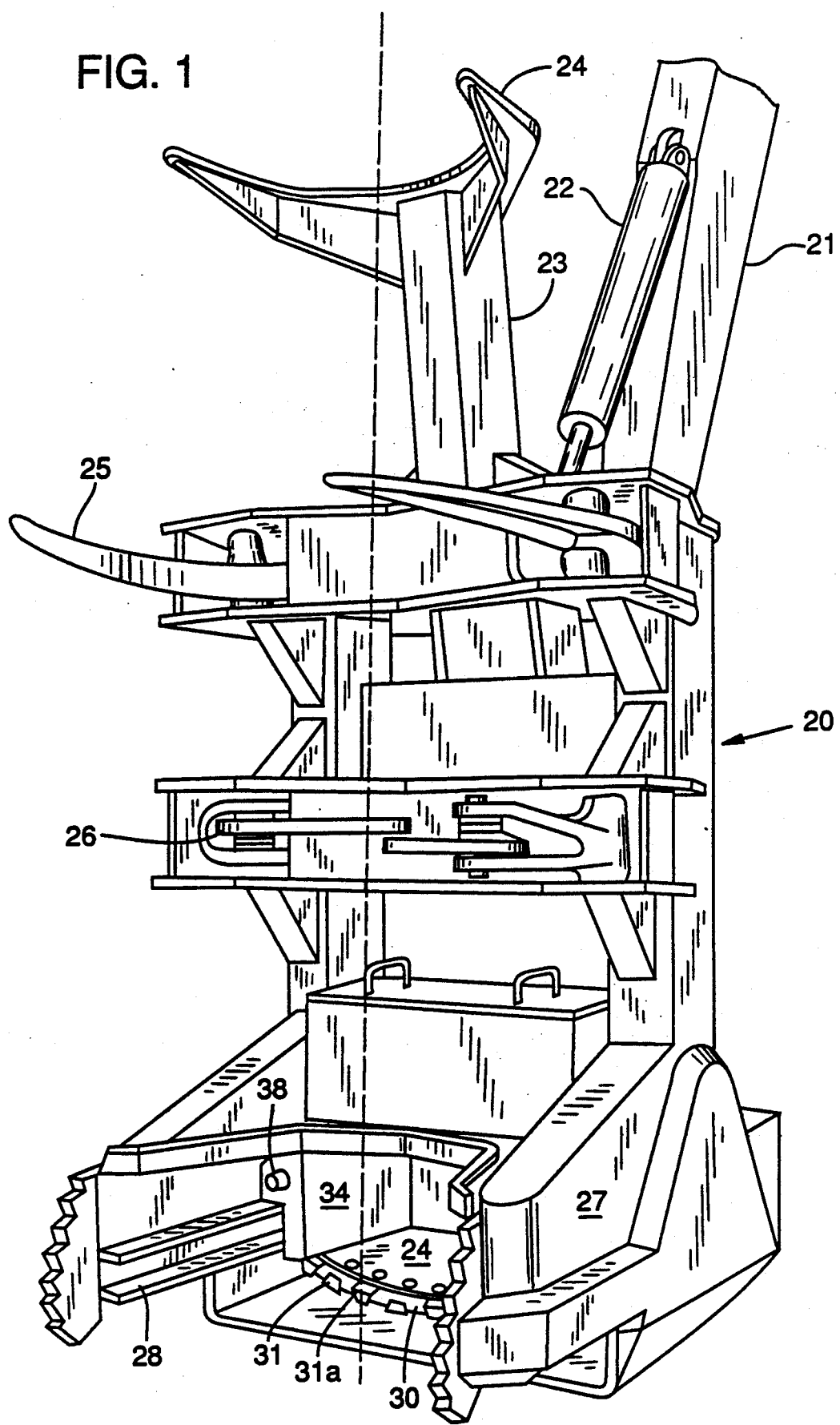
FIG. 1 is a perspective view of the inventive tree saw.
Figure 2:
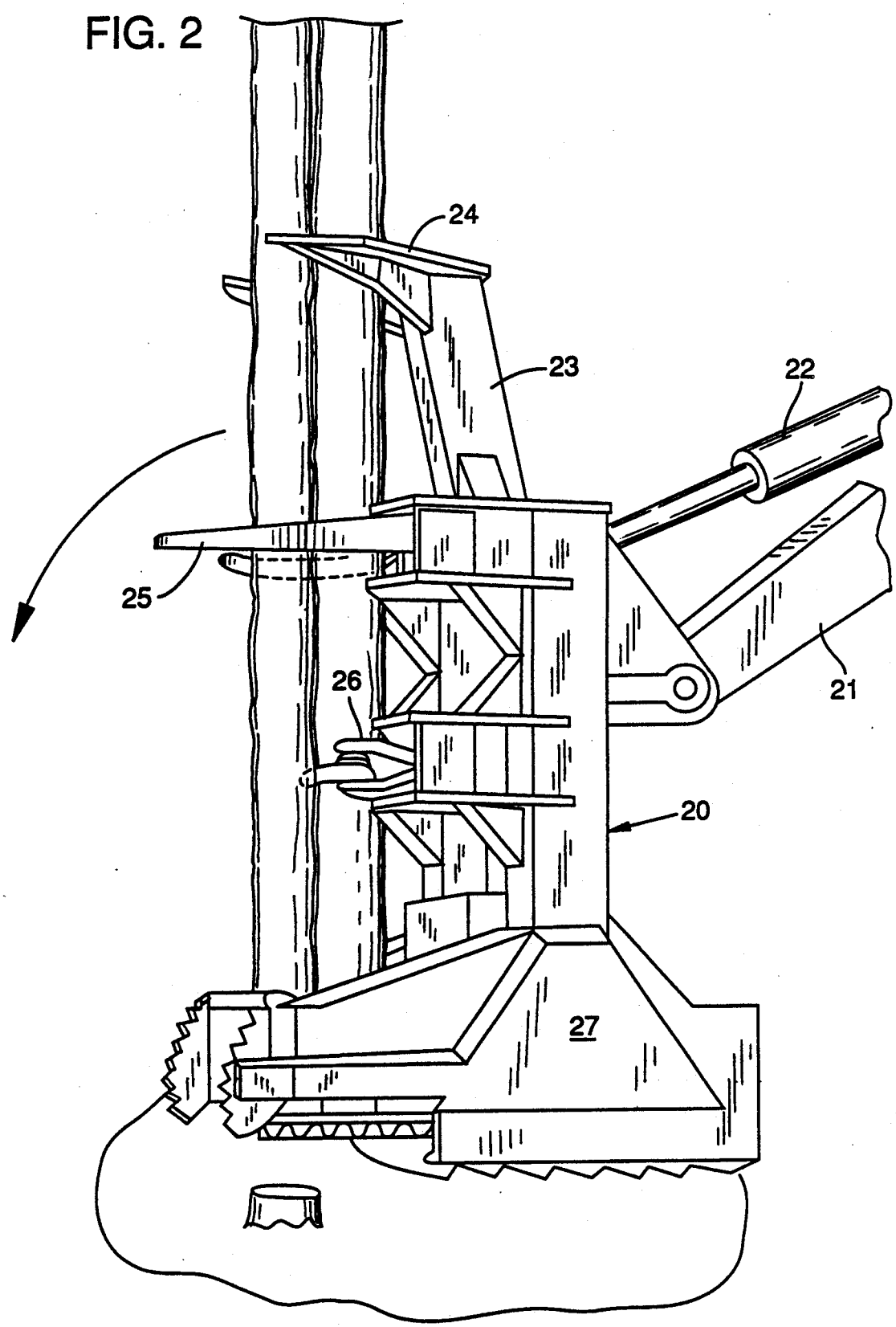
FIG. 2 is another perspective view of the apparatus of FIG. 1.

Referring first to FIGS. 1 and 2, the numeral 20 designates generally the frame of the inventive tree saw. The frame 20 is pivotally connected to lift arms or a boom 21 carried by a crawler or other type prime mover (not shown). Interconnected between the lift arms or boom 21 and the mast portion 23 of the frame are tilt cylinders 22.

The frame 20 is equipped with stationary arms 24 at the upper end of the mast and movable clamping arms 25 a spaced distance therebelow. Below the arms 25 are provided movable accumulator arms 26. The position of the clamp and accumulator arm pairs can be reversed. Below the accumulator arms 26 is a lower frame 27 which provides means 28 for supporting the carriage assembly 29.

The rim 30 on which the double edged cutting teeth 31, 31a are pivotally connected rotates in either clockwise or counterclockwise direction during cutting action. The direction of rotation is selected by controlling the hydraulic oil flow to the motor 43 (See FIG. 3).

For this purpose, the lower frame 27 is provided with channels 28 for the saw carriage assembly generally designated 29. Thus, the carriage assembly 29 is reciprocably mounted within the lower frame and rotatably carries the bi-directional rim member 30. The rim 30 on its periphery is equipped with staggered, opposed teeth 31, 31a. Thus, as the rim rotates in either clockwise or counterclockwise direction on the carriage assembly 29 and the carriage assembly 29 is moved forward in the channels 28, the saw functions to cut a tree and, where indicated, the accumulator arms 26 hold the first tree cut while the clamping arms 25 embrace the already cut tree plus another tree in the process of being cut.

Figure 3:
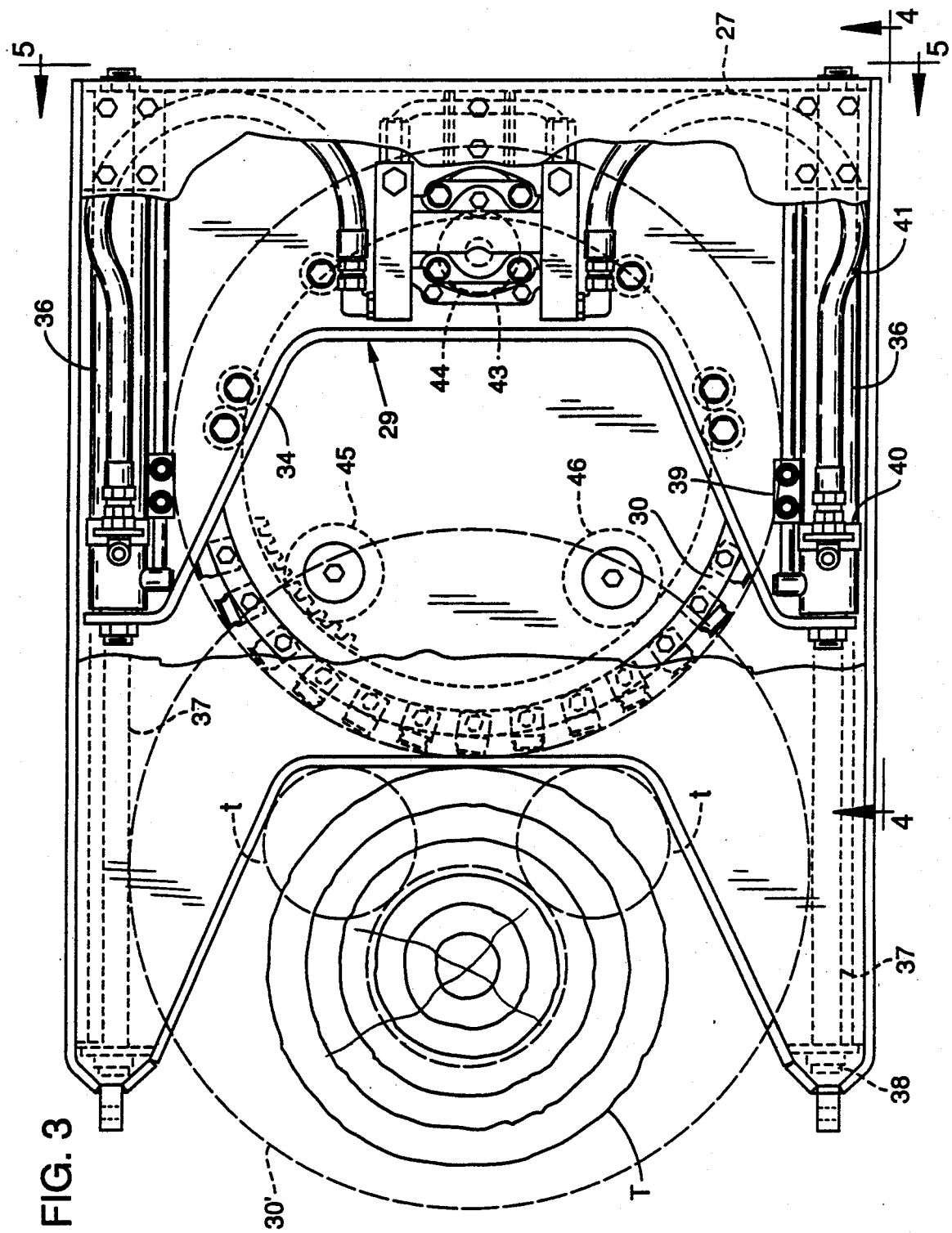
FIG. 3 is top plan view of the carriage partially broken away to show interior parts.

The arrangement in plan can be seen in FIG. 3 and at the left hand end of FIG. 3, the extent of out-reach of the rim 30 is designated 30′. Thus, the saw can cut either a large tree T or accumulate a plurality of smaller trees t which it has previously cut.

Figure 5:
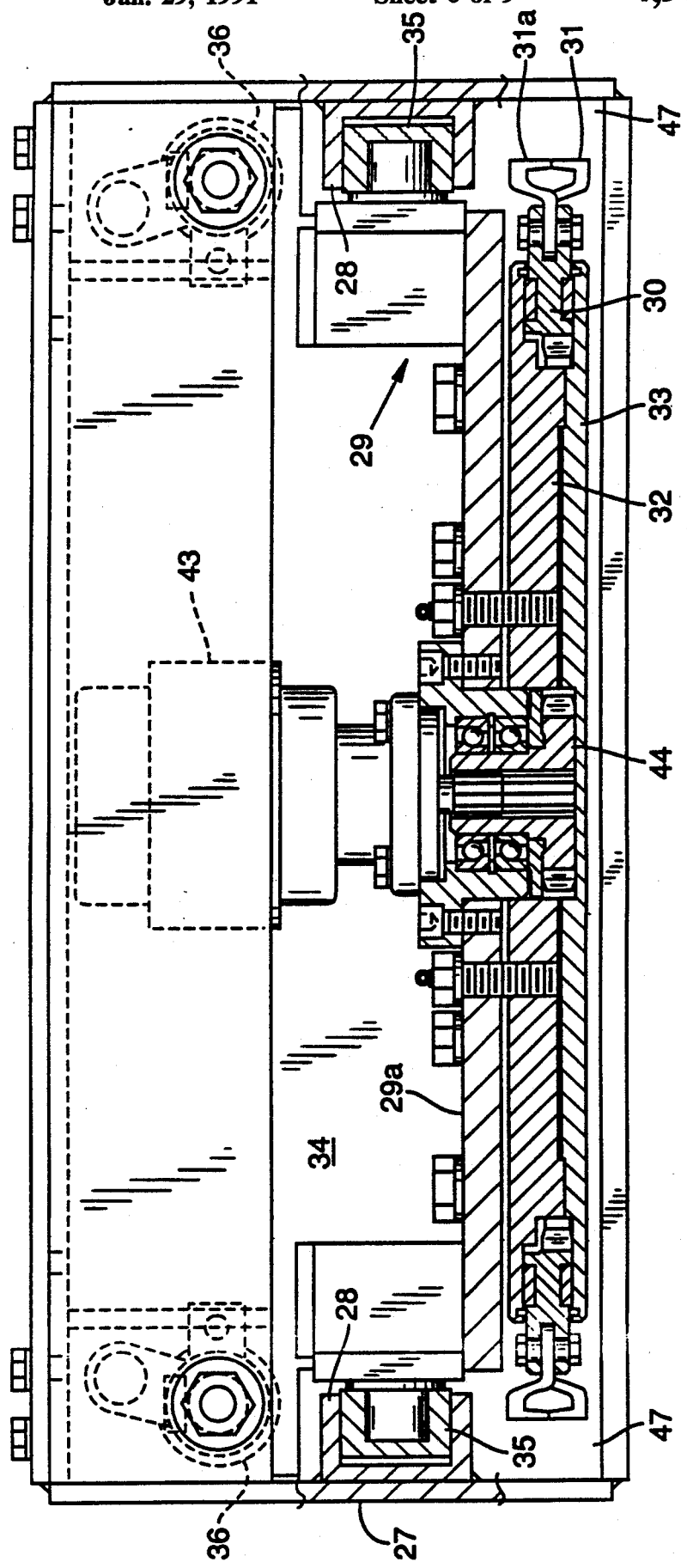
FIG. 5 is a rear end elevational view of the chassis portion of the carriage as seen along the sight line 5—5 of FIG. 3.
Figure 6:
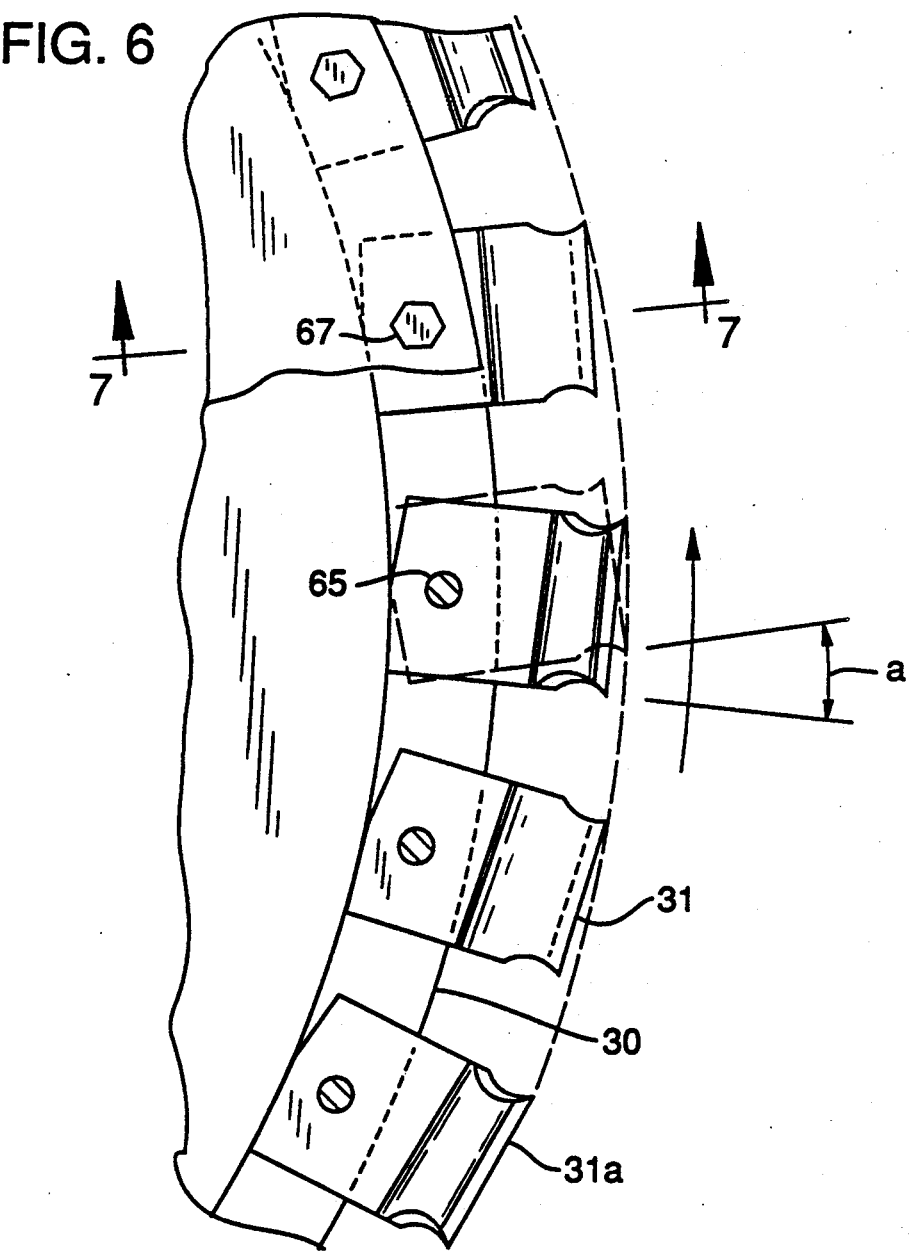
FIG. 6 is a fragmentary top plan view of a portion of the rim element.

Referring now to FIG. 5 which is a rear end elevational end view of the construction seen in FIG. 3, the opposed teeth 31, 31a can be seen both at the extreme left and extreme right bottom on the rim 30. The rim 30 is rotatably housed within a hub 32 and a cover 33 which are fixed to the generally plate-like carriage chassis 29a to provide a carriage assembly 29 (consisting of the chassis 29a, hub 32, cover 33, rim 30, bulkhead 34 and slide blocks 35).

Projecting up from the chassis 29a is a bulkhead 34-- see the lower central portion of FIG. 1. The carriage chassis 29a (again referring to FIG. 5) carries slide blocks 35 which ride in the channels 28 on the lower frame 27. The carriage assembly 29 is reciprocated by means of left and right cylinders 36.

Now again referring to FIG. 3, the cylinders 36 are fixed at the right end (or rear end as viewed) to the lower frame 27 and at the left (front) the piston rod 37 is secured to bulkhead 34 as at 38--see also the lower left hand portion of FIG. 1.

Referring still to FIG. 3, the numeral 39 designates a connection for oil lines and numeral 40 designates a junction block. Connected to the junction block is a flexible hose 41 which at its other end is connected to the hydraulic motor 43--see also the upper central portion of FIG. 5.

Referring to FIG. 5, a driven pinion 44 for the rim is carried by the motor 43 which in turn is secured to the chassis 29a. The carriage assembly 29 (now referring to FIG. 3) also carries adjustable idler rollers 45, 46 angularly spaced about the pinion 44.

OPERATION GENERALLY

The lower frame 27 of the bi-directional tree saw provides the supporting structure for the carriage assembly 29 and the movable chassis 29a on which the rim 30 is supported. The carriage assembly 29 is guided in the frame channels 28 by pivoted slide blocks 35. Slide blocks are used instead of rollers to eliminate the tendency of guide rollers to jam from rolling over debris.

The moving bulkhead 34 attached (e.g., welded) to the carriage chassis 29a protects the motor 43, cylinders 36 and the hoses 41 by extending above and below them--see FIG. 4. The open back permits debris to move through the lower saw area 47--see the lower right hand portion of FIG. 5.

The overall width of the frame is narrow due to the relationship of the guide channels 28 and the cylinders 36 (see FIG. 5). Oil is provided to the hydraulic motor 43 using rolling loop hoses 41. The hydraulic cylinders 36 extend the carriage 29 and provide the horizontal driving force for the rim 30.

Thus the bi-directional saw carriage mechanism provides the following advantages:

1. The bi-directional cutting action provides the following benefits:
   a. Increased production
   b. Reduced maintenance
   c. Longer cutting tooth life.
2. The moving bulkhead 34 attached to the carriage chassis 29a protects the motor 43, cylinders 36 and hoses 41.
3. The open back 47 permits debris to move through the lower saw mechanism.
4. The overall width is narrow due to the positioning of the carriage guide channels 28 and cylinders 36.
5. Pivoted slide blocks 35 are used instead of guide rollers to eliminate the tendency of rollers to jam from rolling over debris.

BI-DIRECTIONAL SAW BEARING AND DRIVE MECHANISM

Figure 4:
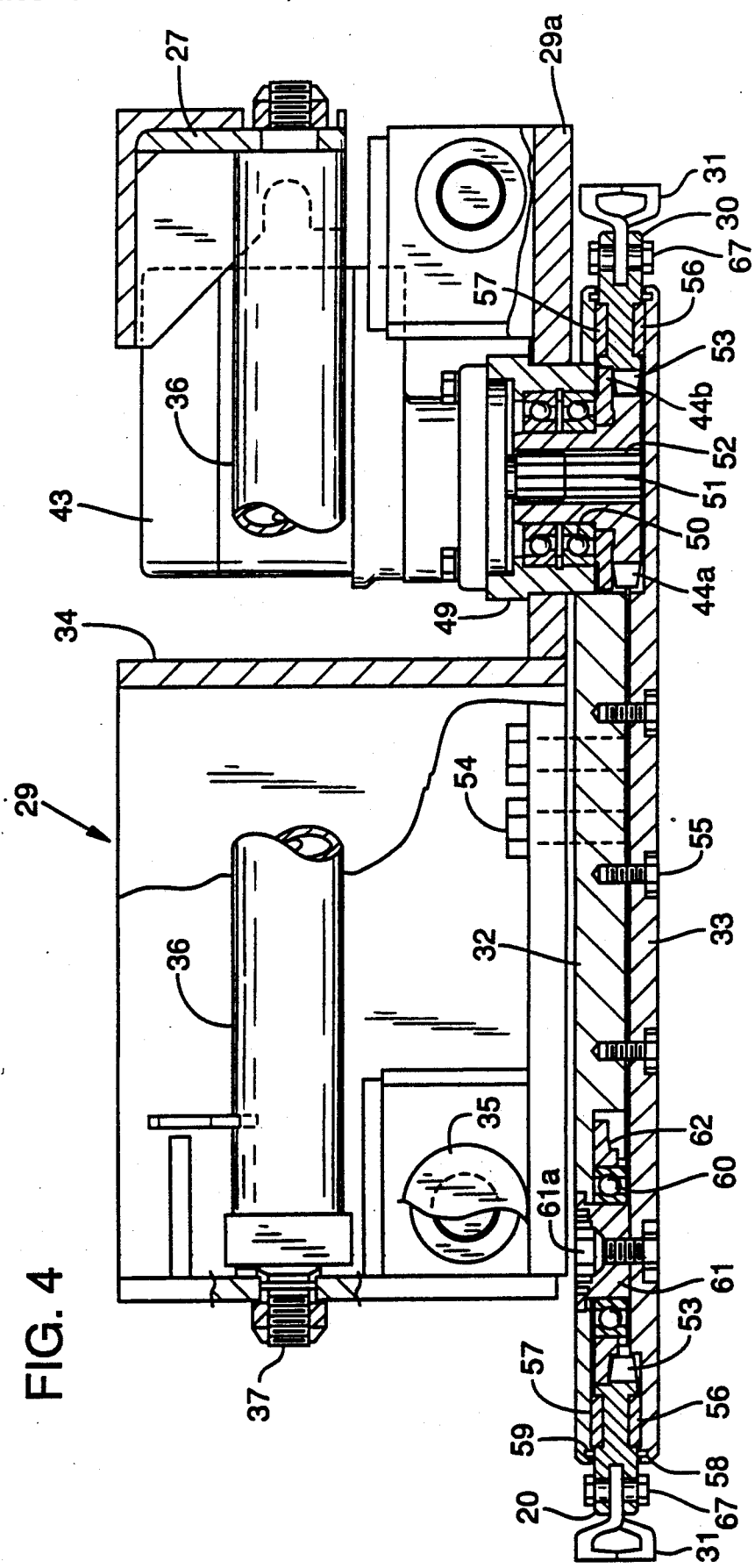
FIG. 4 is a side elevational view of the carriage as seen along the sight line of 4—4 of FIG. 3.

Referring now to FIG. 4 which is a side elevational view, partially broken away, of the construction of FIG. 3, the numeral 29a again designates the carriage chassis (see the lower right hand portion of FIG. 4). The carriage chassis 29a extends substantially over the length of FIG. 4 and at its left hand end is equipped with the moving bulkhead 34 to which are attached the cylinders 36 at their forward ends. The rear ends of the cylinders 36 are connected to the lower frame 27. The carriage chassis 29a rigidly carries an adapter 49--see the lower right hand portion of FIG. 4. In turn, the adapter 49 carries the hydraulic motor 43. The adapter 49 also carries bearings 50 for the driven pinion 44. The extended splined shaft 51 of the motor engages an internal spline 52 in the pinion 44. Thus, the pinion 44 is driven by the motor 43.

Figure 4A:
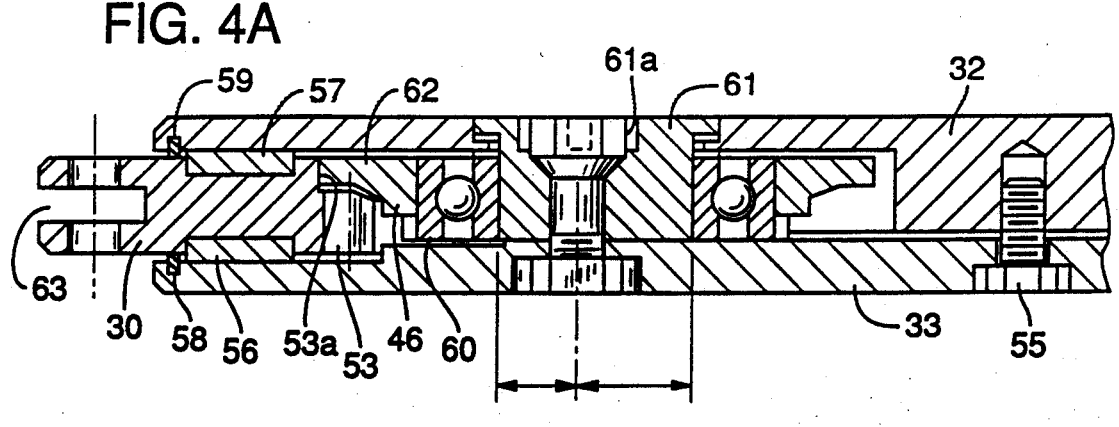
FIG. 4a is a sectional view through a portion of the rim saw.
Figure 4B:
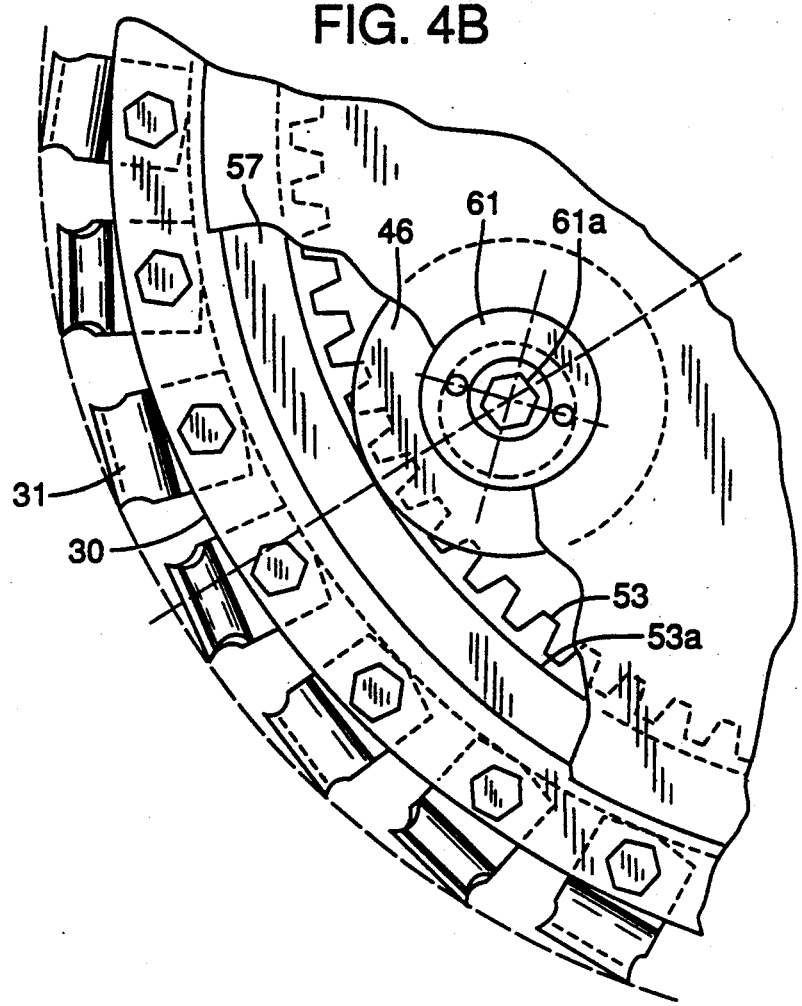

Now referring to FIG. 4B, it is seen that the rim 30 has inwardly facing gear teeth 53. These are engaged by gear teeth 44a on the pinion 44—see the lower right hand portion of FIG. 4.

To provide three point radial, i.e., horizontal, support for the rim 30, we provide the adjustable rollers 45, 46 and additionally a third, fixed roller 44b on the pinion 44--see the lower right hand portion of FIG. 4. These three rollers provide an axial center for rim 30.

Reference to FIG. 4 shows that the carriage chassis 29a carries bolts 54 (see the central portion of FIG. 4) which secure the hub 32 to the carriage chassis 29a. Further bolts 55 secure the cover 33 to the hub 32.

Vertical (axial) support for the rim 30 is provided by bearings 56, 57--see particularly the left hand end of FIG. 4A. The drive mechanism, i.e., the rim 30, is sealed by circular seals 58, 59 which are mounted in the cover 33 and hub 32 respectively, and bear against the upper and lower surfaces of the rim 30. Likewise, the bearing strips 56, 57 are interposed, respectively, between the cover 33 on the one hand and the hub 32 on the other, and the rim 30. The location of the axial bearings 56, 57 on the extreme periphery of the rim 30 provides maximum stability of the rim 30. The drive mechanism is sealed against dirt only, so grease can come out. This is an advantage in keeping parts protected from wear.

The arrangement of the rollers 45, 46 is exemplified by the roller 46 as can be seen in the left hand portion of FIG. 4A. The roller 46 is equipped with an annular bearing 60 which in turn is carried by a vertical shaft 61 secured to the hub 32 and cover 33 by an eccentrically-located connection 61a. By rotating the shaft 61, the rollers 45 and 46 can be adjusted to maintain a three point contact with rim 30 and fixed roller 44b. It will be noted that each of the rollers 45, 46, as exemplified by the roller 46 in FIG. 4A, has a radially extending portion as at 62 to bear against the smooth part 53a of the inner circumference of the rim 30 above the gear teeth 53.

SAW TEETH

Figure 7:
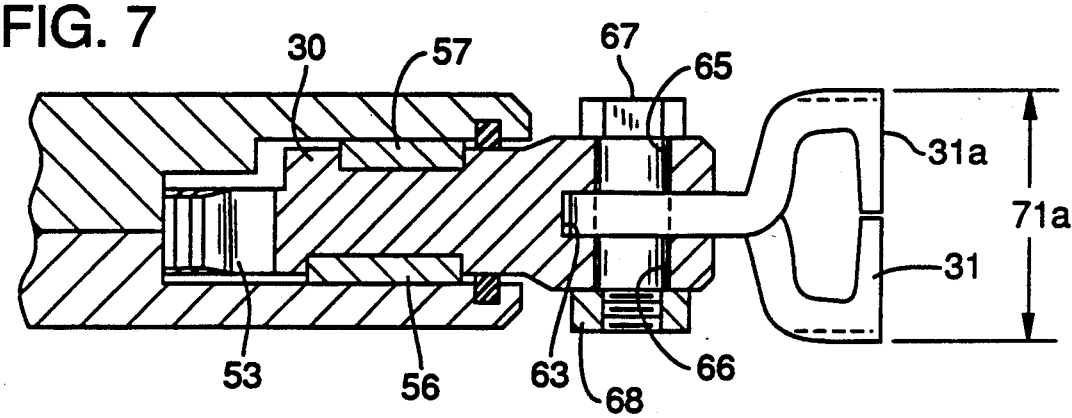
FIG. 7 is a sectional view taken along line 7—7 in FIG. 6.
Figure 8:
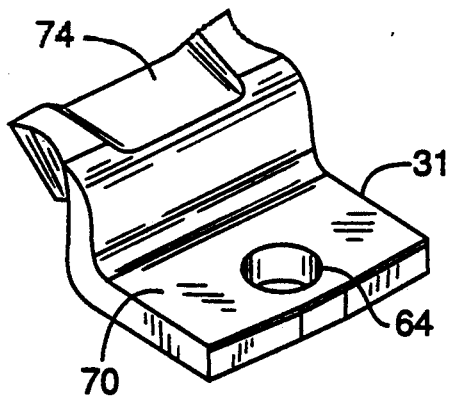
FIGS. 8–12 are various views of the inventive tooth.
Figure 9:
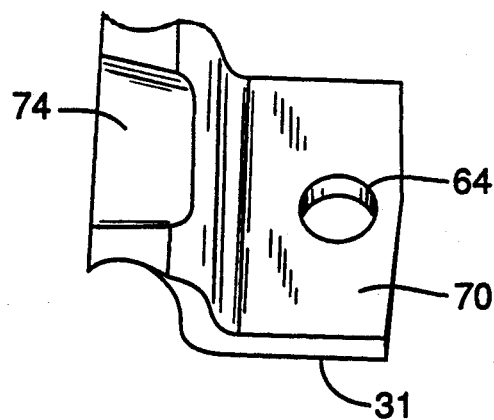
Figure 10:
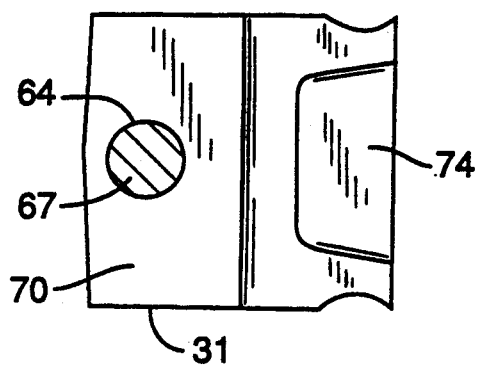

A slot 63 (see the left hand portion of FIG. 4A) is provided in the rim 30 to support the saw teeth 31, 31a. As indicated previously, the saw teeth are reversed and are identical, each having a bolt opening as at 64--see FIGS. 8-12. Referring to FIG. 7, it is seen that the rim 30 has aligned openings 65, 66 above the slot 63 through which a bolt 67 extends and is secured by a nut 68. More particularly, each tooth pivots about the bolt or retaining pin 67 to provide the rake angle a required for cutting in each direction.

Figure 11:
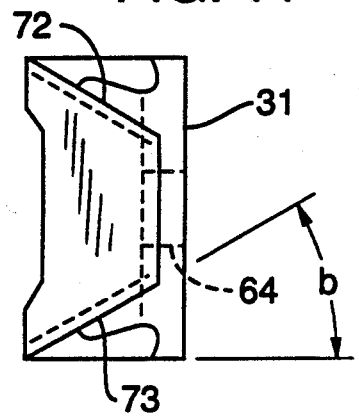
Figure 12:
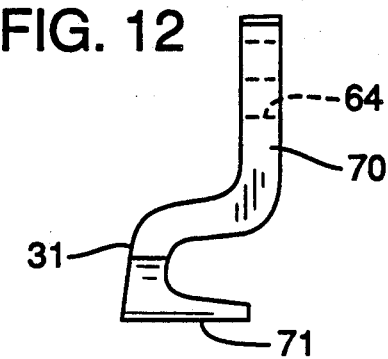
Figure 13:
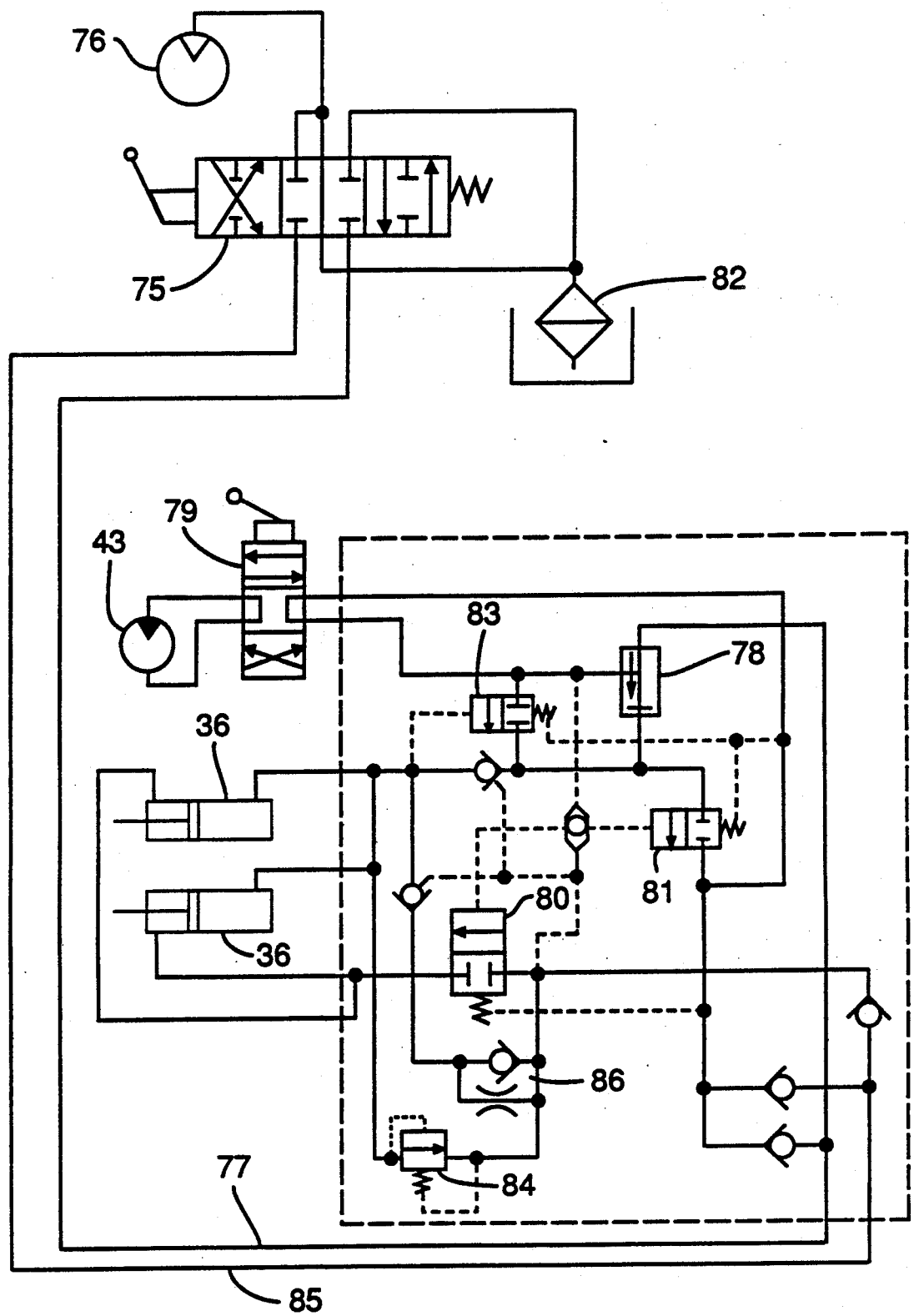
FIG. 13 is a schematic diagram of the hydraulic system.

In one preferred version of the inventive tooth 31, we provide a body with a flat, radially inward portion 70 (compare FIGS. 8-12) which is generally plate-like and with the other end formed into a generally hook shape--see particularly FIG. 12. The body width is about 2½" and the height of the radially outward cutting portion 71 is about 1⅛" high. With the opposed teeth, this develops a kerf 71a approximately 2¼" high.

The inwardly concave cutting edges 72, 73 are developed by a cutter arranged at about 30° to the vertical---see particularly FIG. 11 (angle b). Additionally, we provide a relief 74 having a depth of about ⅛" across the surface of the tooth spaced from the radially outward end so as to provide cutting clearance, i.e., reduce friction to increase cutting efficiency, during the cutting action. The relief extends slightly under 1¾" across the width of the tooth. The cutting area is hardened to maintain sharpness and wear life, leaving the remainder of the body in connection softer and more ductile to minimize breakage.

HYDRAULIC CIRCUIT

A hydraulic control system provides a mechanism by which one control valve 75 mounted on the prime mover activates the saw motor 43 and the carriage cylinders 36. This novel hydraulic arrangement provides a correlation between saw cutting efficiency and the horizontal feed speed of the cylinders 36.

When control valve 75 is activated, flow from pump 76 on the prime mover is directed through valve 75 and a hose 77 to flow divider 78. At flow divider 78, a predetermined quantity of oil is directed to the carriage cylinders 36. These cylinders are connected in a regenerative mode so the oil from the rod end is routed back into the piston end. This causes the carriage cylinders to extend at a rate equivalent to the displacement of the cylinder rods.

The remainder of the oil flows from the flow divider 78 to a reversing valve 79 and the motor 43. The reversing valve 79 has three positions, one causes the motor to rotate clockwise, the second causes the motor to rotate counterclockwise, and the third position isolates the motor from the remainder of the circuit. This is the valve that provides the bi-directional cutting feature.

This division of oil through the flow divider 78 causes the saw motor 43 to rotate and the carriage cylinders 36 to extend at the same time thus advancing the saw to cut the tree. If at any time during the cutting cycle the saw system pressure exceeds a preset amount, the carriage cylinders 36 slow down to avoid stalling the motor 43. This is achieved by the sequence valves 80 and 81. Sequence valve 80 has a lower pressure setting than sequence valve 81.

The saw pressure is sensed by a pilot line to valve 80 and when the saw pressure exceeds the valve setting, the valve shifts taking the carriage cylinders 36 out of the regeneration mode. This discharges the rod oil to tank 82 instead of the piston end of the carriage cylinders, thus causing the carriage speed to decrease. Carriage speed is continuously modulated in this manner during the cutting phase. If the saw pressure subsequently drops back below the setting on valve 80 then valve 80 returns to its original position.

However, if the saw pressure continues to build then sequence valve 81 will shift and meter the carriage oil to tank 82. This will slow the carriage speed further to prevent the motor stalling. As with valve 80, if the saw pressure drops back below the setting on valve 81 then it will return to its original position.

Sequence valve 83 senses the carriage cylinder 36 pressure and allows the saw to continue rotating when the carriage cylinders are fully extended. This allows the saw to be used as a brush cutter. Valve 83 directs the carriage oil from the flow divider 78 to the saw motor. This is necessary to keep the saw motor rotating because the flow divider 78 is designed such that when the primary flow to the carriage cylinders 36 stops, the flow to the motor 43 is blocked.

Valve 84 is a relief valve connected to the carriage cylinders and is used to protect the carriage assembly from external forces. To retract the saw carriage after the tree has been cut, the control valve 75 is moved in the opposite direction from the cutting direction. This causes oil to flow from the pump 76, on the prime mover through a hose 85 through a check valve 86 to the rod side of the carriage cylinders 36. During the retract sequence, no oil is diverted to the motor 43.

We claim:

1. A bi-directional tree saw comprising a frame adapted to be attached to the boom or lift arms of a prime mover, tree clamping means on said frame, a carriage assembly on said frame below said clamping means,
   said carriage assembly including a generally plate-like chassis, a generally U-shaped bulkhead upstanding from said chassis providing a recessed base portion and forwardly-extending arm portions, slide means on said arm portions,
   rail means on said frame receiving said slide means for reciprocating movement of said carriage assembly,
   hydraulic cylinder means interconnecting said bulkhead and frame for reciprocating said carriage assembly,
   an annular rim member rotatably mounted on said chassis, said rim member having a geared inner circumference and a toothed outer circumference projecting forwardly of said base portion,
   means on said tree saw for receiving rim rotation direction allowing said tree saw to cut in clockwise and counter clockwise directions,
   teeth mounted pivotally to said rim with two cutting edges allowing said tree saw to cut in both clockwise and counterclockwise directions and said teeth pivoting about the retaining bolt to provide rake angle required for cutting in each direction,
   motor-driven pinion means on said chassis for engaging said rim member inner circumference to rotate said rim member.

2. The tree saw of claim 1 in which said cylinder means, said motor and flexible hose means constitute a hydraulic system, said bulkhead extending above and below said hydraulic system to protect the same.

3. The tree saw of claim 1 in which a plurality of rollers are rotatably mounted on said chassis, said rim member vertically adjacent said geared inner circumference having a smooth inner circumference in bearing engagement with said plurality of rollers to stabilize said rim member horizontally.

4. The tree saw of claim 3 in which said pinion means is axially aligned with one of said plurality of rollers.

5. The tree saw of claim 4 in which said roller are spaced equally circumferentially relative to said rim member, said aligned roller being the most rearward of said plurality.

6. The tree saw of claim 1 in which said carriage assembly has a circular hub secured to said chassis therebelow and a circular cover below said hub and secured thereto, said hub being radially recessed to accommodate said rim member.

7. The tree saw of claim 6 in which annular bearing strips are interposed between said hub and said rim member and between said rim member and said cover.

8. The tree saw of claim 6 in which said hub is additionally recessed at a plurality of equally circumferentially spaced locations, a roller mounted between said hub and cover at each of said locations, said rim member vertically adjacent said geared inner circumference having a smooth inner circumference in bearing engagement with said rollers.

9. The tree saw of claim 8 in which the one of said locations most rearward has said pinion means also located therein.

10. The tree saw of claim 9 in which said body above said most rearward location is equipped with adapter means supporting said motor, said pinion means being journalled in said adapter means and carrying one of said rollers.

11. The tree saw of claim 1 in which said rim member is equipped with a radially extending slot in its outer circumference, and a plurality of generally hook-shaped saw teeth mounted in said slot.

12. The tree saw of claim 11 in which said rim member is equipped with a pair of aligned openings above and below said slot for each of said teeth, each tooth being equipped with a bolt-receiving opening aligned with said pair of aligned openings, and a bolt extending through said openings.

13. The tree saw of claim 12 in which each of said teeth is limitedly pivotal o its associated bolt.

14. The tree saw of claim 11 in which said teeth are alternately reversed relative to the hook portions thereof.

15. The tree saw of claim 11 in which each tooth has a flat radially inner portion received in said slot and an integral hook-shaped radially outer portion extending beyond said rim member, said outer portion having inclined vertical sides each with horizontally concave contour, said vertical sides being convergent toward the end of said hook-shaped outer portion.

16. The tree saw of claim 15 in which each tooth has a generally flat surface adjacent said outer portion, and a relief in said surface between said vertical side walls and spaced therefrom.

17. The tree saw of claim 11 in which each of said teeth is mounted in said slot for limited rotation therein, the radially inner edge of each tooth being beveled to accommodate limited pivotal movement thereof.

18. The tree saw of claim 1 in which said motor is equipped with means for reversing the rotation thereof, said rim member teeth having vertical sides, each side being equipped with a cutting edge.

19. The tree saw of claim 18 in which each tooth is mounted for limited pivotal movement in a plane parallel to said chassis to develop a rake angle in either direction of rim member rotation.

20. The tree saw of claim 1 in which said carriage assembly has an open rear end to permit passage of debris therethrough.

21. The tree saw of claim 1 in which said cylinder means are positioned vertically above said rail and slide means.

22. The tree saw of claim 1 in which said rail means include a pair of channels, one on each arm portion and open toward each other, said slide means including a pivotal connection on said chassis, and a block coupled to each pivotal connection.

23. A chassis for a rim-type tree saw comprising a generally plate-like body, a circular hub secured to the underside of said body, and a circular bottom cover secured to the underside of said hub, said hub being equipped with a radial recess about the periphery thereof, a rim member mounted in said hub recess having a toothed outer circumference and geared inner circumference, and motor means coupled to said rim member for rotating the same secured to the upper side of said body.

24. The chassis of claim 23 in which annular bearing strips are interposed between said hub and said rim member and between said rim member and said cover.

25. The chassis of claim 23 in which said hub is additionally recessed at a plurality of equally circumferentially spaced locations, a roller mounted between said hub and cover at each of said locations, said rim member vertically adjacent said geared inner circumference having a smooth inner circumference in bearing engagement with said rollers.

26. The chassis of claim 25 in which the one of said locations most rearward has pinion means also located therein interposed between said motor means and rim member for coupling the same.

27. The chassis of claim 26 in which said body above said most rearward location is equipped with adapter means supporting said motor means, said pinion means being journalled in said adapter means and carrying one of said rollers.

28. The chassis of claim 22 in which said rim member is equipped with a radially extending slot in its outer circumference, and a plurality of generally hook-shaped saw teeth mounted in said slot.

29. The chassis of claim 28 in which said rim member is equipped with a pair of aligned openings above and below said slot for each of said teeth, each tooth being equipped with a bolt-receiving opening aligned with said pair of aligned openings, and a bolt extending through said openings.

30. The chassis of claim 29 in which each of said teeth is limitedly pivotal on its associated bolt.

31. The chassis of claim 28 in which said teeth are alternately reversed relative to the hook portions thereof.

32. The chassis of claim 22 in which each tooth has a flat radially inner portion received in said slot and an integral hook-shaped radially outer portion extending beyond said rim member, said outer portion having inclined vertical sides each with horizontally concave contour, said vertical sides being convergent toward the end of said hook-shaped outer portion.

33. The chassis of claim 32 in which each tooth has a generally flat surface above said outer portion, and a relief in said surface between said vertical side walls and spaced therefrom.

34. The chassis of claim 22 in which each of said teeth is mounted in said slot for limited rotation therein, the radially inner edge of each tooth being beveled to accommodate limited pivotal movement thereof.

35. A tooth for a tree saw comprising a unitary plate-like body formed into a hook-shaped configuration in side elevation and providing a generally flat mounting shank portion and a curved cutting portion, the sides of said cutting portion being inclined toward each other in proceeding toward the end of said cutting portion, each of said cutting portion sides being concave.

36. The tooth of claim 35 in which said body has a flat surface spaced from the end of said cutting portion, and a relief in said flat surface.

* * * * *